US009100714B2

(12) United States Patent
Gasnier

(10) Patent No.: US 9,100,714 B2
(45) Date of Patent: Aug. 4, 2015

(54) AUDIENCE-MEASURING METHOD

(71) Applicant: Viaccess, Paris la Défense (FR)

(72) Inventor: Jean-Marc Gasnier, Noyal-Chatillon-sur-Seiche (FR)

(73) Assignee: VIACCESS, Paris la Défense (FR)

( * ) Notice: Subject to any disclaimer, the term of this patent is extended or adjusted under 35 U.S.C. 154(b) by 0 days.

(21) Appl. No.: 14/378,868

(22) PCT Filed: Feb. 7, 2013

(86) PCT No.: PCT/EP2013/052401
§ 371 (c)(1),
(2) Date: Aug. 14, 2014

(87) PCT Pub. No.: WO2013/124159
PCT Pub. Date: Aug. 29, 2013

(65) Prior Publication Data

US 2015/0058876 A1 Feb. 26, 2015

(30) Foreign Application Priority Data

Feb. 21, 2012 (FR) .................................... 12 51573

(51) Int. Cl.

| | |
|---|---|
| ***H04H 60/33*** | (2008.01) |
| ***H04N 21/63*** | (2011.01) |
| ***G06Q 30/02*** | (2012.01) |
| ***H04L 29/08*** | (2006.01) |
| ***H04N 21/24*** | (2011.01) |
| ***H04N 21/426*** | (2011.01) |
| ***H04N 21/442*** | (2011.01) |

(52) U.S. Cl.
CPC ............ *H04N 21/632* (2013.01); *G06Q 30/02* (2013.01); *G06Q 30/0201* (2013.01); *H04L 67/104* (2013.01); *H04L 67/1063* (2013.01); *H04L 67/1076* (2013.01); *H04L 67/1093* (2013.01); *H04L 67/22* (2013.01); *H04N 21/2407* (2013.01); *H04N 21/42684* (2013.01); *H04N 21/44222* (2013.01)

(58) Field of Classification Search
USPC ........................................ 725/9, 16, 94, 104
See application file for complete search history.

(56) References Cited

U.S. PATENT DOCUMENTS

| | | | | |
|---|---|---|---|---|
| 2004/0215698 | A1 | 10/2004 | Bertin | |
| 2008/0163303 | A1* | 7/2008 | Chou et al. | 725/46 |
| 2010/0146138 | A1* | 6/2010 | Ng et al. | 709/231 |
| 2011/0153391 | A1* | 6/2011 | Tenbrock | 705/7.33 |

FOREIGN PATENT DOCUMENTS

| | | |
|---|---|---|
| WO | 2009/141378 | 11/2009 |
| WO | 2009/147163 | 12/2009 |
| WO | 2011/084779 | 7/2011 |

OTHER PUBLICATIONS

Shahzad Ali et al., "Measurement of commercial peer-to-peer live video streaming," School of Computer Science Carnegie Mellon University (Jan. 2, 2006).

Ali et al., "Measurement of Commercial Peer-To-Peer Live Video Streaming," In Proceedings of the Workshop in Recent Advances in Peer-to-Peer Streaming (2006).

Cholez et al., "Une architecture de honeypots distribués pour superviser le réseau P2P KAD," 9e Conférence Internationale sur Les Nouvelles Technologies de la Repartition pp. 76-82 (2009).

Cholez et al., "Etat de l'art: Réseaux pair à pair, supervision, sécurité et approches collaboratives," (2010).

Daswani, "Denial-Of-Service (DOS) Attacks and Commerce Infrastructure in Peer-To-Peer Networks," Stanford University Doctoral Dissertation (2004).

Dhungel et al., "The Pollution Attack in P2P Live Video Streaming: Measurement Results and Defenses," Proceedings of the 2007 workshop on Peer-to-peer streaming and IP-TV pp. 323-328 (2007).

Douceur , "The Sybil Attack," PS '01 Revised Papers from the First International Workshop on Peer-to-Peer Systems pp. 251-260 (2002).

Eittenberger et al., "Measurement and Analysis of Live-Streamed P2PTV Traffic," HET-NETs pp. 195-212 (2010).

Engle et al., "Vulnerabilities of P2P Systems and a Critical Look at their Solutions," Networking and Media Communications Research Laboratories Computer Science Dept., Kent State University Technical Report (2006).

Fallica et al., "On the Quality of Experience of SopCast," NGMAST '08, The Second International Conference on Next Generation Mobile Applications, Services and Technologies pp. 501-506 (2008).

Gheorghe, et al., "Security and Privacy Issues in P2P Streaming Systems: A Survey," University of Trento Technical Report (2009).

Haridasan et al., "SecureStream: An Intrusion-Tolerant Protocol for Live-Streaming Dissemination," Computer Communications 31:3, pp. 563-575 (2008).

(Continued)

*Primary Examiner* — Mulugeta Mengesha

(74) *Attorney, Agent, or Firm* — Occhiuti & Rohlicek LLP

(57) ABSTRACT

A method for measuring an audience of peers of a television channel streamed over a peer-to-peer network includes connecting at least one monitored peer to the peer-to-peer network and sending by the at least one monitored peer a request to at least one neighboring peer of the peer-to-peer network. There is an identifier of the at least one neighboring peer contained in its own list of neighboring peers. In reply to the request, receiving by the at least one monitored peer a list of neighboring peers receiving the television channel streamed over the peer-to-peer network and containing for this purpose, in their respective buffer memory, chunks of the television channel likely to be downloaded by any one of the peers of the peer-to-peer network. The method also includes updating by the at least one monitored peer of its own list of neighboring peers by adding to this list the identifiers of neighboring peers present in the list received and which were not already present in its own list of neighboring peers. The method further includes constructing the audience measurement from the list of neighboring peers of the at least one monitored peer.

11 Claims, 3 Drawing Sheets

(56) References Cited

OTHER PUBLICATIONS

Lesniewski-Laas, “A Sybil-proof one-hop DHT,” SocialNets’08 (2008).

Lesueur et al., “Gestion distribuée d’identités résistante à la Sybil attack pour un réseau pair-á-pair,” Sixth Conference on Security and Network Architectures (SARSSI) (2007).

Nicolosi et al., “P2PCast: A Peer-to-Peer Multicast Scheme for Streaming Data,” 1st IRIS Student Workshop (2003).

Prêtre, “Attacks on Peer-to-Peer Networks,” Swiss Federal Institute of Technology (ETH) Zurich Thesis (2005).

Seibert et al., “‘Won’t You Be My Neighbor?’ Neighbor Selection Attacks in Mesh-based Peer-to-Peer Streaming,” Computer Science Technical Reports. Paper 1694 (2008).

Sirui et al., “The Content Pollution in Peer-to-Peer Live Streaming Systems: Analysis and Implications,” ICPP ’08 37th International Conference on Parallel Processing, pp. 652,659, 9-12 (2008).

Tangpong, “Managing Sybil Identities in Distributed Networks,” The Pennsylvania State University The Graduate School Doctoral Dissertation (2010).

Wang, “Attacks Against Peer-to-peer Networks and Countermeasures,” Helsinki University of Technology Seminar on Network Security (2006).

Xie et al., “Coolstreaming: Design, Theory, and Practice,” IEEE Transactions on Multimedia, vol. 9, No. 8 (2007).

* cited by examiner

AUDIENCE-MEASURING METHOD

RELATED APPLICATIONS

This application is a U.S. National Stage of international application number PCT/EP2013/052401filed Feb. 7, 2013, which claims the benefit of the priority date of French Patent Application FR 1251573, filed on Feb. 21, 2012, the contents of which are herein incorporated by reference.

FIELD OF INVENTION

The invention relates to a method for measuring the audience of a television channel broadcast in a continuous stream over a peer-to-peer network. Another subject of the invention is an information storage medium, a monitored peer and a counting terminal for implementing this method.

BACKGROUND

The term "Broadcasting in a continuous stream" denotes a mode of transmission of a multimedia content wherein a client equipment item can play the multimedia content as it receives it. "Broadcasting in a continuous stream" is better known by the term "streaming" or "live" broadcasting.

Streaming differs from "file downloading". In file downloading, the client equipment item must first receive all the packets making up the multimedia content before it can start to play this multimedia content. There is no predetermined order or a predetermined time interval in which a fragment of the file must be received by its recipient.

In streaming, on the contrary, the stream fragments must be received in a predetermined time interval around the instant of receiving of a previous fragment of this same stream. If the fragment has not been received in the predetermined time interval, it is eliminated and will not be read by the multimedia reader. To do this, typically, each fragment is associated with a lifetime. If the fragment has not reached its recipient before its lifetime has elapsed, the fragment is destroyed. Thus, the playing of a television channel can start before all the fragments that make it up have been received. To do this, all the fragments generally take the same route in the Internet. For example, a previously established routing table is constructed and used for this purpose.

"Terminal-to-terminal" networks are better known by the term "Peer-to-peer" network.

Such a peer-to-peer network is formed by a large number of computers, known as peers, interconnected by an information transmission network. Typically, the information transmission network is the world-wide web, better known by the term "Internet".

In a peer-to-peer network, a peer can download a fragment or chunk of a television channel from the buffer memory of any other peer of the peer-to-peer network that receives the same television channel. In this description, the peer that downloads the chunk is known as the "child peer" and the peer from which the child peer downloads the chunk is known as the "parent peer". In a peer-to-peer network, each peer is able to play, generally at the same time, the roles of child peer and parent peer. Thus, a peer is capable of playing, at the same time, the roles of client, server and router to direct the chunks stored in its buffer memory toward the buffer memory of the child peers.

In a peer-to-peer network, a child peer contains a list of neighboring peers. This list contains identifiers of peers, called "neighboring peers", of the peer-to-peer network that this peer knows and can therefore contact to try to download a chunk of the television channel. Typically, the identifier of a peer is its IP (Internet Protocol) address and a port number used to exchange information by way of the Internet with the computer application that manages the connection and the implementation of the peer-to-peer network. This application is called "peer-to-peer software program" here.

Streaming of television channels over peer-to-peer networks is developing quickly and it is supposed that there exists today a large number of viewers for each television channel thus broadcast. To date, to measure the audience of a television channel streamed over a peer-to-peer network, it has been necessary to equip a large number of peers with a recording device. This therefore entails the active participation of the viewer so that the latter accepts and installs this recorder on the computer that he connects to the peer-to-peer network (see for example patent application WO 2011 084 779).

Audience measurements constructed in this way are hardly exhaustive because of the necessarily limited number of peers equipped with the recorder.

The prior art is also known from:

Shahzad Ali, Anket Mathur and Hui Zhang: "Measurement of commercial peer-to-peer live video streaming", School of Computer Science Carnegie Mellon University, Jan. 2, 2006,

US 2004/215698A1.

SUMMARY OF INVENTION

The aim of the invention is to remedy this drawback. Its subject is therefore a method for measuring the audience of a television channel streamed over a peer-to-peer network in accordance with claim 1.

The audience measurement constructed using the method above is simpler because it does not require each peer used for measuring the audience to be equipped with a recording device. Indeed, the fact of using lists of neighboring peers transmitted by so-called "conventional" peers, i.e. peers not equipped with any particular recording device, to take the audience measurement makes it possible to collect the audience information from the conventional peers in a simple way. From that point, it is easier to collect a much larger quantity of information, which increases the exhaustiveness of the constructed audience measurement.

The embodiments of this method can include one or more features of the dependent method claims.

These embodiments of the method furthermore have the following advantages:

- the looped repetition of the steps b) to d) by the monitored peer makes it possible to construct a much more complete list of neighboring peers more quickly than a conventional peer, and therefore to obtain an audience measurement more quickly or to obtain a more precise audience measurement;
- the simultaneous use of several monitored peers makes it possible to increase the speed with which an audience measurement can be constructed;
- the indication in the counting table that a peer is no longer responding makes it possible to have a more precise instantaneous view of the audience of the television channel;
- the presence, in the counting table, of the instant of addition of a neighboring peer and of the instant from which this neighboring peer is no longer receiving the television channel allows an audience measurement that takes into account the duration of the connections to the television channel;

the identification of segments of the television channel makes it possible to correlate the audience measurement with an identified multimedia content;

the obtaining of an identifier of a geographical area from the IP address of the neighboring peer makes it possible to take audience measurements by country;

distributing the IP addresses of the various monitored peers over various continents is likely to increase the speed of collection of a large number of identifiers of neighboring peers.

Another subject of the invention is a method for visualizing a television channel streamed over a peer-to-peer network in accordance with claim 9.

Another subject of the invention is an information storage medium in accordance with claim 10.

Another subject of the invention is a monitored peer for implementing the audience measurement method above.

A final subject of the invention is a counting terminal for implementing the audience measurement method above.

The invention will be better understood upon reading the following description, given solely by way of non-limiting example, and made with reference to the drawings.

BRIEF DESCRIPTION OF THE DRAWINGS

In these figures, the same references are used to denote the same elements.

DETAILED DESCRIPTION

In the rest of this description, features and functions well known to those skilled in the art are not described in detail.

Figure 1:
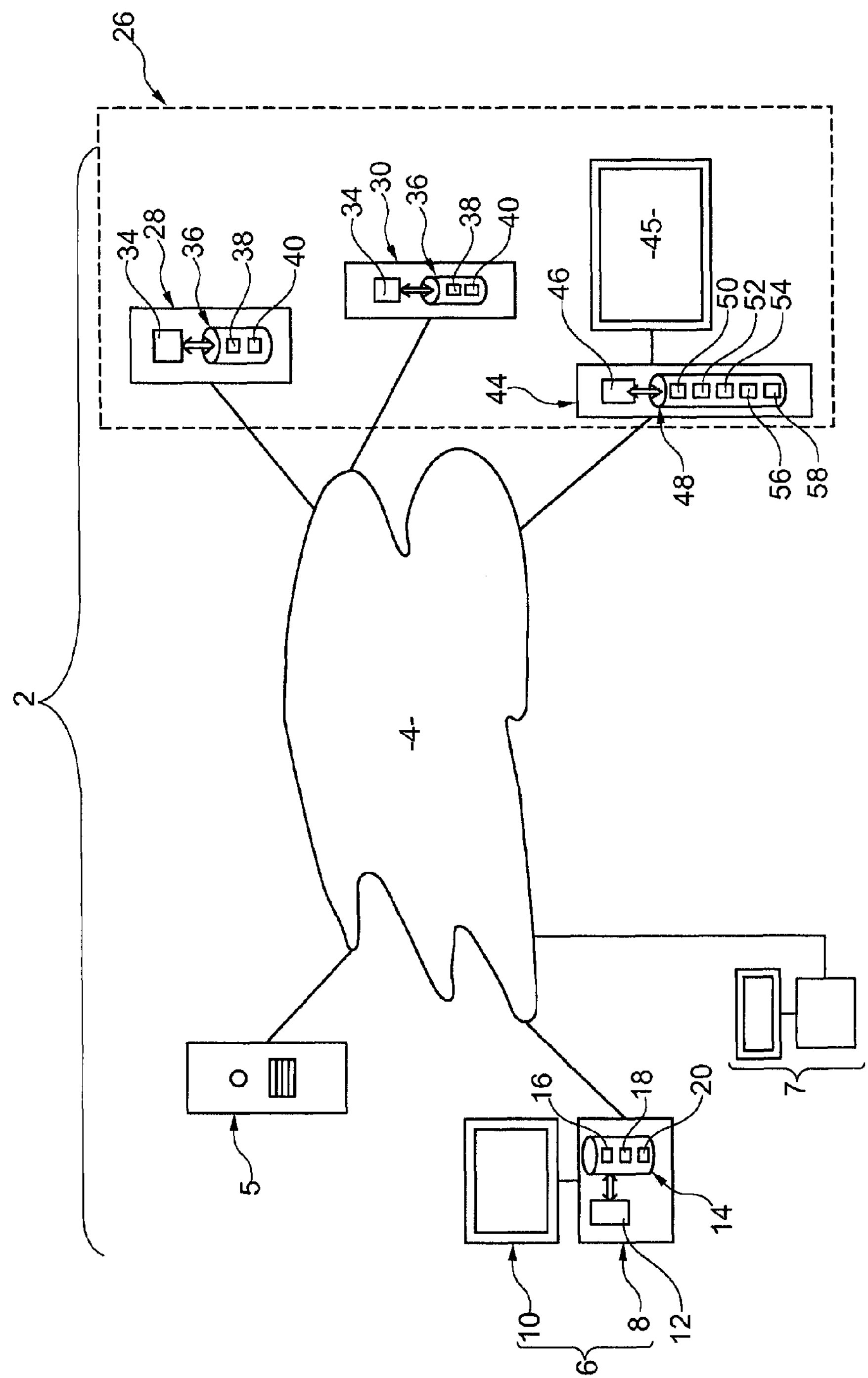
FIG. 1 is a schematic illustration of a system for visualizing a television channel streamed over a peer-to-peer network.

FIG. 1 represents a system for visualizing television channels streamed over a peer-to-peer network formed by peers interconnected by an information transmission network 4. The network 4 is the world-wide web. The system 2 is described in the special case where the peer-to-peer network uses the SopCast protocol. This protocol is for example described in the following articles:

Benny Fallica et al., "On the Quality of Experience of SopCasf",

Philipp Eittenberger et al., "Measurement and analysis of live streamed P2PTV Traffic", HET-NETs 2010, ISBN 978-83-926054-4-7, pages 195 to 212.

The rest of the description is given for a single television channel. However, the description for this television channel applies identically to other television channels broadcast over the same peer-to-peer network.

The system 2 comprises a server 5 for an initial list of neighboring peers. This server is known by the terms "broker" or "tracker".

The system 2 comprises a large number of conventional peers connected to each other by way of the network 4. To simplify FIG. 1, only two conventional peers 6 and 7 are represented. These peers 6 and 7 are for example identical and only the peer 6 is described in detail.

The peer 6 is a computer equipped with a central unit 8 and a screen 10. The central unit 8 comprises a programmable electronic computer 12 capable of executing instructions stored on an information storage medium. For this purpose, the computer 12 is connected to a memory 14 containing the instructions needed to execute the method in FIG. 7. More precisely, the memory 14 comprises in particular:

the instructions of a peer-to-peer software program 16 able to download the various video segments of a television channel in a continuous stream, the instructions of a multimedia reader 18 capable of playing a multimedia content downloaded onto the screen 10, and a list 20 of neighboring peers constructed by the software program 16.

The peer-to-peer software program 16 is a SopCast client module here.

The peer 6 is connected to the network 4. For this purpose, it has an IP (Internet Protocol) address and a port number associated with the SopCast client module. This IP address and this port number are used by the peer 6 to communicate with other peers of the peer-to-peer network.

The system 2 also comprises an appliance 26 for measuring the audience of a television channel streamed over the peer-to-peer network. This appliance 26 comprises a large number of monitored peers. Here, the monitored peers of the appliance 26 are implemented on virtual machines executed on various servers distributed over various countries on various continents. Thus, the monitored peers have IP addresses corresponding to various countries on various continents according to the nomenclature of the IP addresses established by the IANA (Internet Assigned Numbers Authority).

These monitored peers are for example structurally identical to each other. To simplify FIG. 1, only two monitored peers 28 and 30 are represented. These peers are implemented on different servers and therefore have different IP addresses.

Only the monitored peer 28 is described in detail. The peer 28 includes a programmable electronic computer 34 capable of executing instructions stored on an information storage medium. For this purpose, the peer 28 includes a memory 36 containing the instructions needed to execute the method in FIG. 7. More precisely, the memory 36 includes the instructions of a SopCast client module 38. This client module 38 is identical to the module 16, but also includes additional functions which will be described with reference to the method in FIG. 7. The memory 36 also includes a list 40 of neighboring peers.

The appliance 26 also includes a counting terminal 44 optionally connected to a screen 45.

Figure 7:
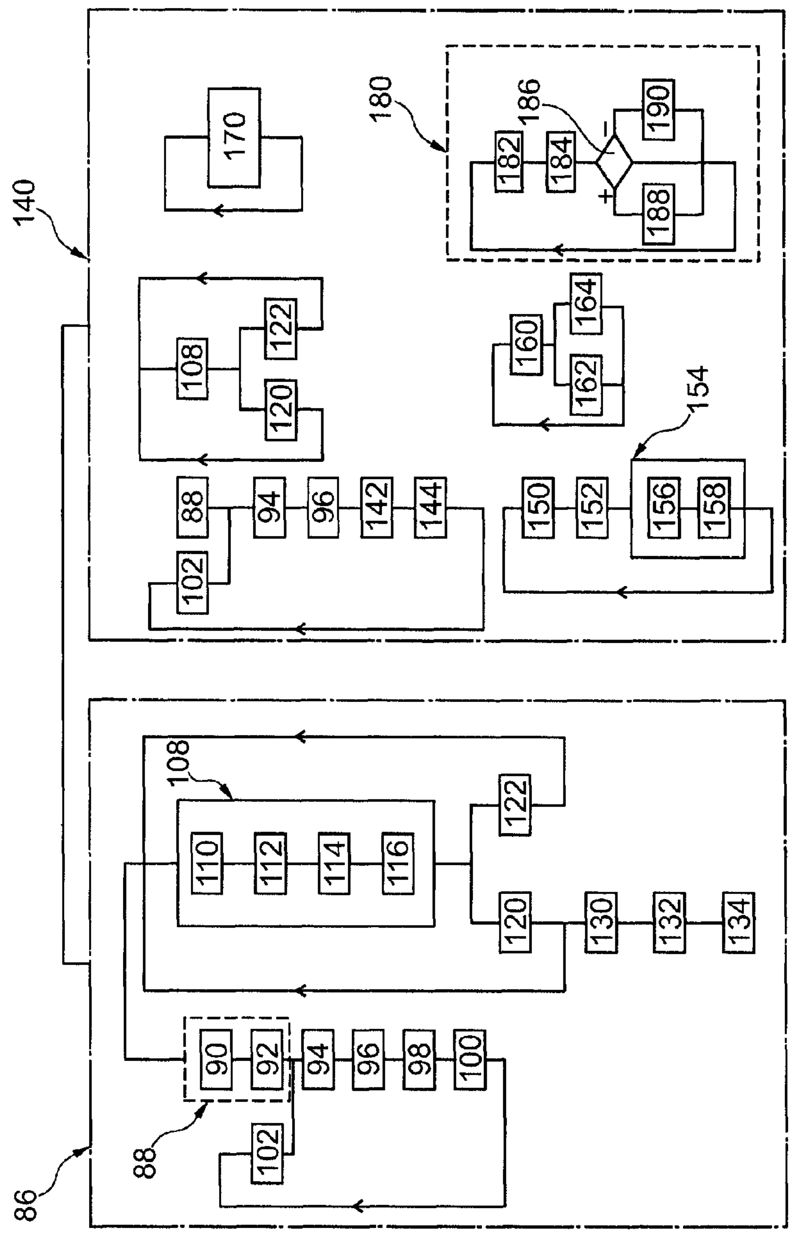
FIG. 7 is a block diagram of a method for visualizing a television channel using the system in FIG. 1.

The terminal 44 comprises a programmable electronic computer 46 capable of executing instructions stored on an information storage medium to execute the method in FIG. 7. For this purpose, the computer 46 is connected to a memory 48 containing the instructions needed to execute the method in FIG. 7.

More precisely, the memory 48 here includes:

the instructions of a SopCast client module 50 identical to the module 16, the instructions of a multimedia reader 52 identical to the multimedia reader 18, the instructions of a module 54 for constructing an audience measurement, a counting table 56, and a database 58 of fingerprints of multimedia contents.

Figures 2, 3, 4, 5, 6:
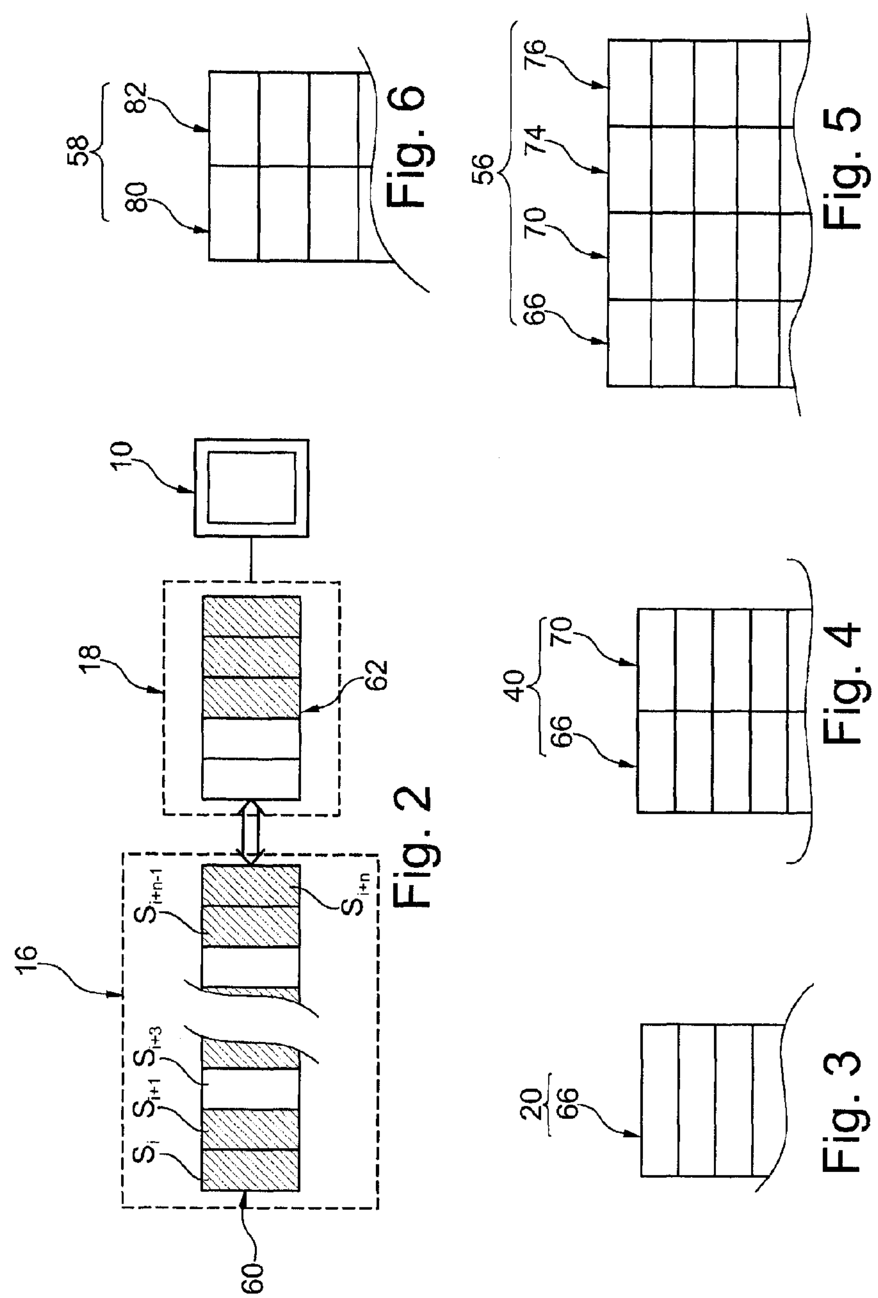
FIG. 2 is a schematic illustration of various buffer memories of a peer of the peer-to-peer network in FIG. 1.
FIGS. 3 to 6 are schematic illustrations of various lists and tables used in the system in FIG. 1.

FIG. 2 represents in more detail the buffer memories of a conventional peer. The client module 16 implements a buffer memory 60 capable of containing a time period $\Delta T$ of the television channel broadcast at a given moment. Typically, the time period $\Delta T$ is below or equal to 1 min and above 15 s. Here, the time period $\Delta T$ is equal to 40 s plus or minus 5 s.

More precisely, the television channel is divided into a large number of time segments $S_i$ immediately consecutive to each other. These time segments $S_i$ are known by the term "chunk". Here, the index i represents the order number of a chunk. This index i identifies the position of the chunk with respect to the other chunks in the same television channel. For example the chunks $S_i$ are classed by increasing order number.

The buffer memory 60 is designed to contain "n" chunks $S_i$ to $S_{i+n}$.

In FIG. 2, the wavy lines indicate that only part of the memory 60 has been represented.

In FIG. 2, the hatched chunks $S_i$ are chunks already received by the client module 16 and which can be downloaded by other peers of the peer-to-peer network. Conversely, the white chunks $S_i$ are chunks to be downloaded by the client module 16 from one or more parent peers.

It will therefore be understood that using this buffer memory 60, a chunk $S_i$ can be received in advance or delayed with respect to the chunks $S_{i-1}$ and $S_{i+1}$. The time window inside which the chunk $S_i$ must be received is a function of the time period $\Delta T$. If the chunk $S_i$ is not received in this time window, it is eliminated and cannot be visualized on the screen 10.

The multimedia reader 18 also implements a buffer memory 62 wherein the various chunks $S_i$ of the television channel to be watched are transferred from the buffer memory 60 as the multimedia content is read and displayed on the screen 10.

FIG. 3 represents the list 20 of neighboring peers. This list 20 essentially comprises, for each instance of storage, a field 66 intended to contain the IP address and the port number of the client module 16 of the conventional "neighboring" peer of the peer 6. For example the field 20 can contain the IP address and the port number of the client module of the peer 7.

FIG. 4 represents the list 40 of neighboring peers. This list 40 is identical to the list 20, except that it also includes a field 70 intended to contain the instant of addition of the neighboring peer to the list 40. This field 70 is associated with each field 66 containing an IP address and a port number.

FIG. 5 represents the counting table 56. This table 56 is identical to the list 40, except that it also includes the fields 74 and 76 for each instance of storage. The field 74 is intended to contain the instant of disconnection of a neighboring peer. The field 76 is intended to contain an identifier of a geographical area corresponding to the IP address of the neighboring peer. The geographical area can be a continent, a group of countries, a country, a region of a country or a town.

FIG. 6 represents the database 58. This database essentially contains, for each instance of storage, a field 80 containing a fingerprint and a field 82 containing an identifier of the multimedia content corresponding to this fingerprint. The fingerprints are fingerprints of multimedia content. For example they are constructed in accordance with the method described in the application WO 2009 141 378. The identifier of the multimedia content can be a title of a film or of a program or of a sporting event or other content.

The operation of the system 2 will now be described with reference to the method in FIG. 7.

The method includes a phase 86 of visualizing, by a conventional peer, a television channel streamed over the peer-to-peer network of the system 2. This phase 86 is described in the special case where the peer 6 is a child peer and the peer 7 is a parent peer.

In a step 88, the peer 6 connects to the peer-to-peer network. In this step 88, and more precisely in an operation 90, the peer 6 acquires the identifier of the television channel to be watched. For example, it can be the number of the television channel.

Next, in an operation 92, the client module 16 of the peer 6 sends a request to the server 5 to obtain a first list of neighboring peers currently watching the same television channel.

In a step 94, the client module 16 receives this list of neighboring peers. This list of neighboring peers contains the IP addresses and the port numbers of the client modules executed by the neighboring peers.

Next, in a step 96, the child peer sends a request to the peers contained in the received list to distinguish the active peers in this list apart from the inactive peers therein.

If the peer that has received the request replies, and if the latter is not already in the list 20 of the peer 6, in a step 98, the peer 6 updates the list 20. This updating consists in adding to the list 20 the IP address and the port number of the client module of the neighboring peer that has replied. Thus, the list 20 contains the IP addresses and the port numbers of the client modules of the peers from which the peer 6 is likely to download a chunk of the television channel that it has selected.

In a step 100, the peers polled by the child peer also add to their own list 20 of neighboring peers the IP address and the port number of the client module 16 of the peer 6.

If it is necessary for new neighboring peers to be discovered, then a step 102 follows wherein the peer 6 sends a request to one of the neighboring peers, the address of which is contained in its own list 20, to receive the list of the neighboring peers of this neighboring peer. For example the peer 6 sends the request to the peer 7. The step 102 is then followed by the step 94.

The repetition of the steps 94 to 102 allows the peer 6 to complete its own list 20 and therefore to discover new neighboring peers.

In parallel, in a step 108, the peer 6 proceeds to download chunks of the television channel. To do this, in an operation 110, it requests from a neighbor peer, whose IP address is contained in its list 20, to provide the identifiers of the chunks $S_i$ that the buffer memory of this neighboring peer contains.

In an operation 112, as a reply, the peer 6 receives from the neighboring peer the list of the chunks $S_i$ that it contains.

If this received list contains identifiers of chunks that the child peer does not possess, then, in an operation 114, the child peer requests from this neighboring peer the transmission of one or more of the chunks that it lacks.

In reply, in an operation 116, the neighboring peer, which is also from that point onward a parent peer, sends the requested chunks to the child peer.

If the chunk requested from the neighboring peer is received in the required time window, in a step 120, the child peer stores the downloaded chunk in its buffer memory 60. In the opposite case, in a step 122, if the chunk has not been received in the required time window, the peer 6 repeats the steps 110 to 122 with the following neighboring peer identified in its list 20.

Thus, quite quickly, the peer 6 identifies one or more parent peers, generally less than five or less than three, from the buffer memory 60 from which it can download in time the chunks needed to fill its own memory 60. The term "fill in time" indicates that the downloaded chunks are received in time to fill, above a predetermined threshold $S_1$, the buffer memory 60 with immediately consecutive chunks. For example the threshold $S_1$ corresponds to two, three or over 10 consecutive chunks $S_i$. From that moment, it is no longer necessary to repeat the steps 94 to 102. Consequently, the peer 6 puts an end to the iteration of the steps 94 to 102.

In a step 130, when the number of segments downloaded is above a predetermined threshold $S_2$, the peer 6 launches the execution of the multimedia reader 18.

In a step 132, the multimedia reader 18 downloads the video chunks from the memory 60 to its own buffer memory 62.

Next, in a step 134, the multimedia reader 18 plays the video chunks in order on the screen 10.

The roles of child peer and parent peer can be reversed. Thus, conventionally, the peer 6 is a child peer for several peers of the peer-to-peer network and, also at the same time, a parent peer for one or more peers of this same peer-to-peer network.

In parallel with the phase 86, a phase 140 of measuring the audience of the television channel streamed over this peer-to-peer network is executed.

The various monitored peers operate in the same way. Thus, the phase 140 is only described in the special case of the monitored peer 28.

The monitored peer 28 proceeds to the same steps 88 to 122 as a conventional peer except that the steps 98 and 100 are replaced, by steps 142 and 144 respectively. The step 142 is identical to the step 98, except that the IP address and the port number of the neighboring peer are added to the list 40 and this IP address and this port number are associated with an instant of entry into this list 40 stored in the memory in the field 70. The instant of entry is for example measured based on an internet clock of the peer 28.

The step 144 is executed when the peer 28 is polled by other conventional peers. It is identical to the step 100 except that the IP address and the port number are stored in the list 40 associated with an instant of entry into this list 40.

In this embodiment, the monitored peer 28 does not execute the steps 130 to 134.

The monitored peer 28 differs from the conventional peer 6 in that it executes an infinite loop containing the steps 94 to 102. Thus, the step 102 is systematically repeated in a loop for each new neighboring peer added to the list 40. Moreover, this iteration of the steps 94 to 102 is not stopped even if the list 40 already contains neighboring peers from the memory 60 from which the monitored peer 28 can download in time the chunks needed to fill its own memory 60.

In this embodiment, the fact that the monitored peer downloads the chunks allows it to play the role of parent peer toward other child peers of the peer-to-peer network. This makes it possible to discover other neighboring peers than those contained in the list received in the step 94.

In parallel, in a step 150, the module 54 for constructing the audience measurement requests from each monitored peer its own list 40 of neighboring peers.

As a reply, in a step 152, each monitored peer transmits its list 40 to the counting terminal 44.

In a step 154, the construction module 54 establishes the table 56 on the basis of the various lists 40 received. To do this, in an operation 156, it adds to this table 56 each new neighboring peer not already present in the table. For each neighboring peer added, the fields 66 and 70 are completed from the corresponding fields of the received list 40.

Next, for each new neighboring peer added, in an operation 158, the module 54 continues with the geolocation of its IP address. The geolocation of the IP address consists in identifying a geographical area and typically a country, from the IP address stored in the field 66 of the table 56. Geolocation of this type is known. For example it is performed by implementing the services accessible on Internet sites such as: www.localiser-ip.com or www.loc8ip.com. The identifier of the geographical area thus obtained is stored in the field 76 of the table 56 associated with the IP address of the added neighboring peer.

The steps 150 to 154 are repeated in a loop, for example with a regular interval below 1 minute or below 15 seconds.

In parallel, in a step 160, the construction module 54 executes an infinite loop in which it polls each peer whose IP address features in the field 66. For example, in the step 160, the module 54 sends to the peer a “hello” command.

If the polled peer replies, then, in a step 162, the module 54 leaves the field 74 associated with this peer empty to indicate that this peer is still connected to the television channel.

In the opposite case, in a step 164, the module 54 indicates an instant of disconnection in the field 74 associated with the IP address of this neighboring peer. The instant of disconnection is here chosen to be equal to the date on which the absence of reply of this peer is discovered by the module 54. The date is for example a time period in seconds expressed from a known origin.

In parallel, in a step 170, the module 54 constructs the audience measurement. The audience measurement consists in numbering the number of peers in the table 56 present in a selected geographical area and whose field 74 is empty. This makes it possible to obtain the number of peers currently watching the television channel on the peer-to-peer network in the selected geographical area. The geographical area can be the set of all the identifiable geographical areas or a more limited geographical area such as a country or a region or a town.

In the step 170, other processes can be performed such as the measurement of the average time of connection to this television channel over the peer-to-peer network. This average connection time can be computed on the basis of the differences between the instants contained in the fields 70 and 74.

Typically, the step 170 is repeated in a loop with a frequency below 1 or 5 minutes to refresh the audience measurement in real time.

For example, in the step 170, the constructed audience measurement is displayed on the screen 45. For this purpose, the screen 45 presents a map of the world and the audience measurement carried out for each country is displayed on this map of the world. The average connection time can also be displayed.

Finally, in a step 180, the counting terminal 44 identifies the watched multimedia content. For this purpose, in an operation 182, the terminal 44 downloads one or more chunks of the television channel from a conventional peer or a monitored peer.

Next, in an operation 184, it constructs a fingerprint for all the downloaded chunks. For example this fingerprint is constructed in accordance with the information in application WO 2009 141 378.

In an operation 186, the terminal 44 compares the constructed fingerprint with the fingerprints contained in the field 80 of the database 58.

In an operation 188, if the constructed fingerprint corresponds to one of the previously stored fingerprints, then the identifier of the multimedia content associated with this fingerprint is associated with the audience measurement constructed at the same instant for these chunks.

In the opposite case, in an operation 190, no identifier of multimedia content is associated with these chunks. Typically, the identifier of the multimedia content is associated with an instant of broadcasting measured from the same origin as the instants stored in the field 74. Thus, it is possible to specify the number of peers that have visualized the identified multimedia content.

Many other embodiments are possible. For example, the peer-to-peer network can use other protocols than the SopCast protocol. By way of illustration, the following protocols can be used: Coolstreaming, PPLive, PPStream, TVAnts, Veetle, BT Live, etc.

In another embodiment, the appliance 26 only includes a single monitored peer. In this case, the list 40 of neighboring peers and the table 56 are the same objects. Preferably, in this case, the module 54 for constructing the audience measurement is also implemented in the monitored peer. Thus, in this embodiment, the counting terminal and the monitored peer are combined in the same appliance.

The distribution of the various monitored peers over various continents is not obligatory. Thus, the various monitored peers can also have IP addresses located in one and the same country or in one and the same region.

The monitored peers are not necessarily implemented on virtual machines. In another embodiment each monitored peer is implemented on a conventional computer.

The monitored peer can be devoid or not of a multimedia reader or of a function allowing the broadcast television channel to be played.

In a variant, the polling of the neighboring peers to verify that they are connected to the television channel is performed by the monitored peers rather than by the counting terminal.

In another embodiment, the monitored peer does not proceed to download the chunks of the television channel. Thus, the steps 108, 120 and 122 are omitted.

The geolocation of the IP addresses can be omitted. In this case, it is enough for the audience measurement to number all the peers in the whole world that have visualized the television channel. In this embodiment the field 76 is omitted.

It is not necessary to record the instants of disconnection to carry out an audience measurement. In this case, the field 74 is omitted and the steps 160 to 164 are also omitted. In this embodiment, only the number of peers that have visualized the television channel during the time interval during which the appliance 26 has been in operation are measured.

In another embodiment, in the lists 40 transmitted to the counting terminal 44, other identifiers of the neighboring peers than the IP address are used. This other identifier is typically called an alias. It is constructed on the basis of the IP address and, optionally, of the port number and identifies the neighboring peer in a unique way but does not allow the terminal 44 to retrieve the corresponding IP address solely from the information contained in the alias. The alias is also constructed in such a way that, no matter which monitored peer has constructed it, the alias obtained for the same IP address is the same. This makes it possible to mask the IP addresses from the sight of the counting terminal 44. In this embodiment, preferably, the geolocation is made by the monitored peers. The alias is for example obtained by encrypting the IP address of the neighboring peer with an encryption key.

The identification of the multimedia contents broadcast over the television channel can be performed by other methods. For example the multimedia contents broadcast over this television channel may have been watermarked before broadcasting. This can for example involve methods developed by the companies DIGIMARC® or CIVOLUTION®.

The identification of the broadcast multimedia contents can also be performed by the monitored peers. In this case, the list 40 transmitted by each monitored peer to the counting terminal is completed using the identifier of the multimedia content when it has been possible to identify the latter. In another embodiment, the monitored peers construct the fingerprint or extract the watermark from the downloaded chunks. Next, they transmit the constructed fingerprint or the extracted watermark from the counting terminal. The counting terminal then proceeds to identify the multimedia content by executing, for example, the steps 186 to 190.

In another embodiment, the monitored peers construct the fingerprint or extract the watermark then transmit the fingerprints or the watermark to the counting terminal for a subsequent comparison with the database 58 of the contents. Thus, the identification of the multimedia content can also be performed a posteriori, i.e. a long time after the chunks have been downloaded.

Finally, in a simplified embodiment, the identification of the multimedia content is omitted. In this case, the database 58 can be omitted and the step 180 is omitted.

The invention claimed is:

1. A method for measuring the audience of a television channel streamed over a peer-to-peer network, this method including:

a) a connection of at least one monitored peer to the peer-to-peer network, b) sending by the monitored peer of a request to at least one other neighboring peer of the peer-to-peer network, an identifier of this neighboring peer being contained in its own list of neighboring peers, c) in reply to this request, receiving by the monitored peer of a list of neighboring peers receiving the same television channel streamed over the peer-to-peer network and containing for this purpose, in their respective buffer memory, chunks of the television channel likely to be downloaded by any one of the peers of the peer-to-peer network, d) updating by the monitored peer of its own list of neighboring peers by adding to this list the identifiers of neighboring peers present in the list received in the step c) and which were not already present in its own list of neighboring peers, wherein the method also include:

e) a repetition, by the monitored peer, of the steps b) to d) for each neighboring peer of its list of neighboring peers even if one or more neighboring peers of its own list of neighboring peers already make it possible to download enough chunks of the television channel to fill its own buffer memory in time, and f) a construction of the audience measurement from the list of neighboring peers of the monitored peer.

2. The method as claimed in claim 1, wherein the method includes:

the connection of several monitored peers to the peer-to-peer network, each monitored peer executing the steps b) to d) in parallel and, in addition, a step of transmission of their own list of neighboring peers to one and the same counting terminal, an establishment, on the basis of the lists of neighboring peers transmitted by each monitored peer, of a counting table counting all the identifiers of the neighboring peers collected by each monitored peer, and the construction of the audience measurement on the basis of this counting table.

3. The method as claimed in claim 2, wherein the method also includes:

a looped polling of each neighboring peer of the counting table, receiving of a reply to this poll only if the polled neighboring peer is currently receiving the television channel streamed over the peer-to-peer network, and in the absence of a reply from the polled peer, the indication in the counting table that this polled peer is no longer receiving the television channel and, in the opposite case, the indication in the counting table that this polled peer is currently receiving the television channel.

4. The method as claimed in claim 3, wherein the method includes, associated with the identifier of a neighboring peer, the storage:

of the instant at which the identifier of this neighboring peer was added to the counting table, and of the instant at which the absence of reception of the television channel by this neighboring peer was indicated in the counting table.

5. The method as claimed in claim 2, wherein the method includes:

the download of one or more chunks of the television channel from the buffer memory of one or more neighboring peers, the identifiers of which are contained in the counting table, and a comparison of a fingerprint included or constructed from the downloaded chunk or chunks, with a database of previously stored fingerprints, each fingerprint previously stored in the database being associated with an identifier of a multimedia content, and in the event of a match between the included or constructed fingerprint and one of the previously stored fingerprints, the association of the identifier of the multimedia content associated with the corresponding previously stored fingerprint, with the audience measurement constructed at the same instant.

6. The method as claimed in claim 1, wherein the method includes:

obtaining of an identifier of a geographical area wherein each neighboring peer of the counting table is found from an IP (Internet Protocol) address on the Internet of the neighboring peer, and an association of the identifier of the geographical area with the identifier of the neighboring peer in a counting table.

7. The method as claimed in claim 2, wherein the monitored peers connected to the network have IP addresses on the world-wide web corresponding to various countries distributed over at least three different continents.

8. A method for visualizing a television channel streamed over a peer-to-peer network, wherein a peer, called conventional peer, of the peer-to-peer network:

a) connects to the peer-to-peer network in such a way as to receive the television channel, b) sends a request to at least one neighboring peer, of the peer-to-peer network, an identifier of this neighboring peer being contained in its own list of neighboring peers, c) in reply to this request, receives a list of neighboring peers receiving the same television channel over the peer-to-peer network and containing for this purpose in their respective buffer memory chunks of the television channel likely to be downloaded by any one of the peers of the peer-to-peer network, d) updates its own list of neighboring peers by adding to this list the identifiers of neighboring peers present in the list received in the step c) and which were not already present in its own list of neighboring peers, e) repeats the steps b) to d) for a new neighboring peer contained in its own list of neighboring peers if the conventional peer has not been able to identify in its own list of neighboring peers one or more peers from the buffer memory of which it can download enough chunks of the television channel to fill its own buffer memory in time, and, in the opposite case, the stopping of the repetitions of the steps b) to d), wherein the method also includes:

f) the repetition, by a monitored peer, connected to the peer-to-peer network, of the steps b) to d) for each neighboring peer of its own list of neighboring peers even if one or more peers from its own list of neighboring peers already make it possible to download enough chunks of the television channel to fill its own buffer memory in time, and g) a construction of an audience measurement from the list of neighboring peers of this monitored peer.

9. The method as claimed in claim 1, wherein the method include, an information storage medium, which includes instructions executed by an electronic computer.

10. The method as claimed in claim 1 wherein the monitored peer includes an electronic computer programmed to:

a) connect to a peer-to-peer network, b) send a request to at least one other peer of the peer-to-peer network, an identifier of this neighboring peer being contained in its own list of neighboring peers, c) in reply to this request, receive a list of neighboring peers receiving the same television channel streamed over the peer-to-peer network and containing for this purpose in their respective buffer memory chunks of the television channel likely to be downloaded by any one of the peers of the peer-to-peer network, d) update its own list of neighboring peers by adding to this list the identifiers of neighboring peers present in the list received in the step c) and which were not already present in its own list of neighboring peers, wherein the computer is also programmed to:

e) repeat the steps b) to d) for each neighboring peer of its list of neighboring peers, even if one or more neighboring peers from its own list of neighboring peers already make it possible to download enough chunks of the television channel to fill its own buffer memory in time.

11. The method as claimed in claim 1, wherein the method includes, a counting terminal including a programmable electronic computer and a memory, wherein the electronic computer is programmed to construct the audience measurement from the list of neighboring peers of the monitored peer or monitored peers.

* * * * *